United States Patent [19]

Sacco

[11] Patent Number: 4,790,899
[45] Date of Patent: Dec. 13, 1988

[54] AUTOMATIC TRANSVERSE SPLICING DEVICE FOR ASSEMBLING TIRES

[75] Inventor: Tommaso Sacco, Roma, Italy

[73] Assignee: The Firestone Tire & Rubber Company, Akron, Ohio

[21] Appl. No.: 35,324

[22] Filed: Apr. 7, 1987

[30] Foreign Application Priority Data

Jul. 16, 1986 [IT] Italy ................ 67572 A/86

[51] Int. Cl.⁴ .............................. B29D 30/28
[52] U.S. Cl. .................... 156/421; 156/413
[58] Field of Search ............... 156/408, 410, 411, 412, 156/413, 421, 128.1, 130.3, 134

[56] References Cited

U.S. PATENT DOCUMENTS

| | | | |
|---|---|---|---|
| 2,201,470 | 5/1940 | Bostwick | 156/421 |
| 2,500,273 | 3/1950 | Breth | 156/421 |
| 3,546,043 | 4/1969 | Miksch | 156/410 |
| 3,819,449 | 6/1974 | Caretta | 156/413 |
| 4,004,961 | 1/1977 | Takasuga et al. | 156/421 |

FOREIGN PATENT DOCUMENTS

| | | | |
|---|---|---|---|
| 710826 | 1/1980 | U.S.S.R. | |
| 0975448 | 11/1982 | U.S.S.R. | 156/421 |
| 1125844 | 9/1968 | United Kingdom | |

Primary Examiner—David Simmons
Assistant Examiner—Ramon R. Hoch
Attorney, Agent, or Firm—Ernst H. Ruf

[57] ABSTRACT

For assembling tires on a tire building drum, the two opposite ends of at least some of the successive superimposed layers of elastomeric material constituting the tire are secured to the drum and spliced together by means of an automatic splicing device, a concave-surface roller of which is moved parallel with the axis of the tire building drum, by virtue of a driving device, and into contact with the outer surface of the tire building drum, by virtue of an actuating device.

3 Claims, 3 Drawing Sheets

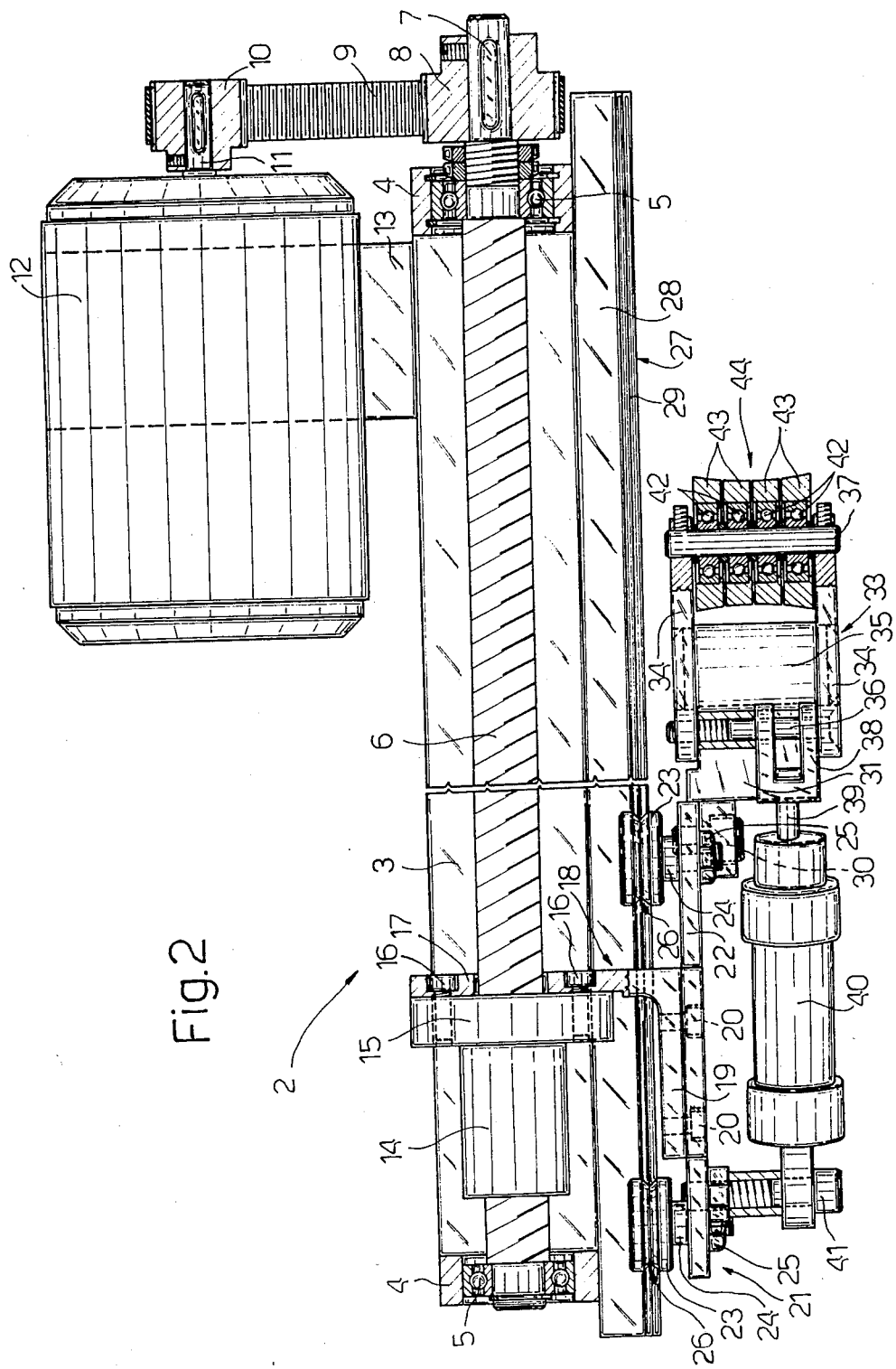

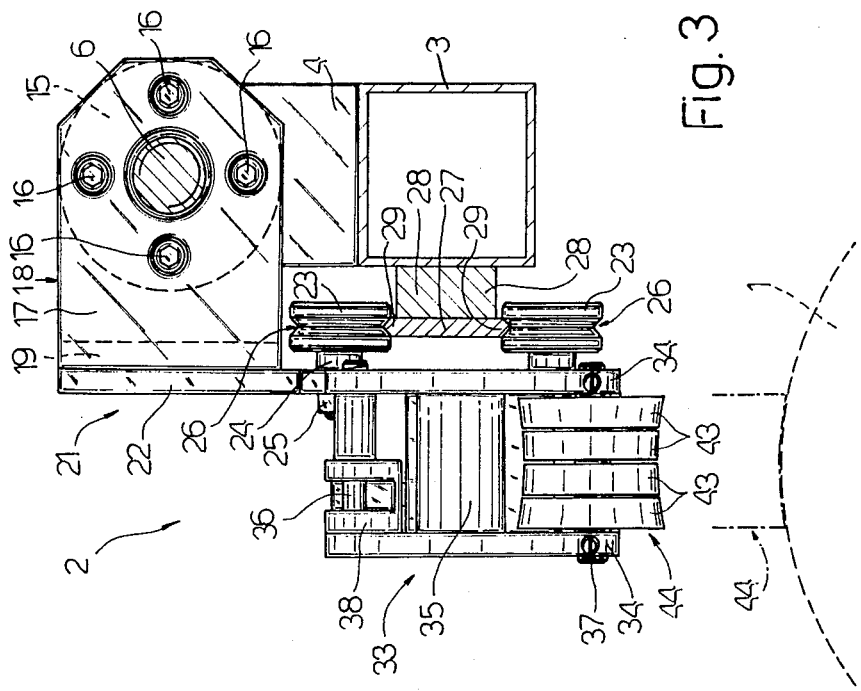

AUTOMATIC TRANSVERSE SPLICING DEVICE FOR ASSEMBLING TIRES

TECHNICAL FIELD

The present invention relates to an automatic transverse splicing device for assembling tires.

BACKGROUND OF THE ART

For manufacturing tires, in particular carcasses of first stage tires, a tire building drum is known to be employed; onto which drum are supplied successive layers comprising, for example, a first layer consisting of an innerliner preassembled, along each lateral edge, onto an abrasion strip and an outer strip constituting a sidewall on the tire, and a second layer consisting of a body ply.

Presently, each of the said layers is generally fed onto the periphery of the tire building drum by means of a feeding device, which usually provides for cutting the layer into portions substantially equal in length to the circumferential development of the tire building drum.

The front edge of a portion of the said first layer is first placed by the operator onto the outer surface of the tire building drum and pressed so as to adhere to the same. Subsequent rotation of the tire building drum causes the said first layer portion to be wound onto the drum, which is then followed by supply of a portion of the next layer. The latter portion is wound onto the tire building drum so as to form a cylinder, and its opposite end edges spliced by means of mechanical pressure of stitching. Similar mechanical pressure is applied through the second layer, for splicing together the opposite end edges of the said first layer.

At the present, affixing the front axial edge of the first layer to the outer surface of the tire building drum and splicing together the opposite end edges of each layer are performed manually, and involve relatively long holdups during the tire manufacturing cycle. As, during such holdups, no additional operating and/or control functions can be performed by the splicing operators, this means a considerable amount of downtime is also involved.

DISCLOSURE OF THE INVENTION

It is an object of the present invention to provide a device enabling straightforward, low-cost automation for affixing the front axial edge of a first layer to the outer surface of a tire building drum, and for splicing together the opposite axial edges of the said first layer and the following layers.

According to the present invention, there is provided an automatic transverse splicing device for assembling tires, the said device being designed to cooperate with the outer lateral surface of a tire building drum and being characterized by the fact that it comprises, in combination, a splicing roller located facing the said outer lateral surface of the said tire building drum; guide means extending laterally in relation to and parallel with the axis of the said tire building drum; slide means designed to travel along the said guide means; and driving means for moving the said slide means in reciprocating manner along the said guide means; the said splicing roller being supported by the said slide means, and actuating means being provided between the said slide means and the said splicing roller, for moving the said splicing roller, in relation to the said slide means, to and from an operating position contacting the said outer surface of the said tire building drum.

A non-limiting embodiment of the present invention will be described by way of example with reference to the accompanying drawings.

BRIEF DESCRIPTION OF THE DRAWINGS

FIG. 2 shows a partially-sectioned top view of the FIG. 1 device; and

FIG. 3 shows an end view of the device in FIGS. 1 and 2.

BEST MODE FOR CARRYING OUT THE INVENTION

Figure 1:
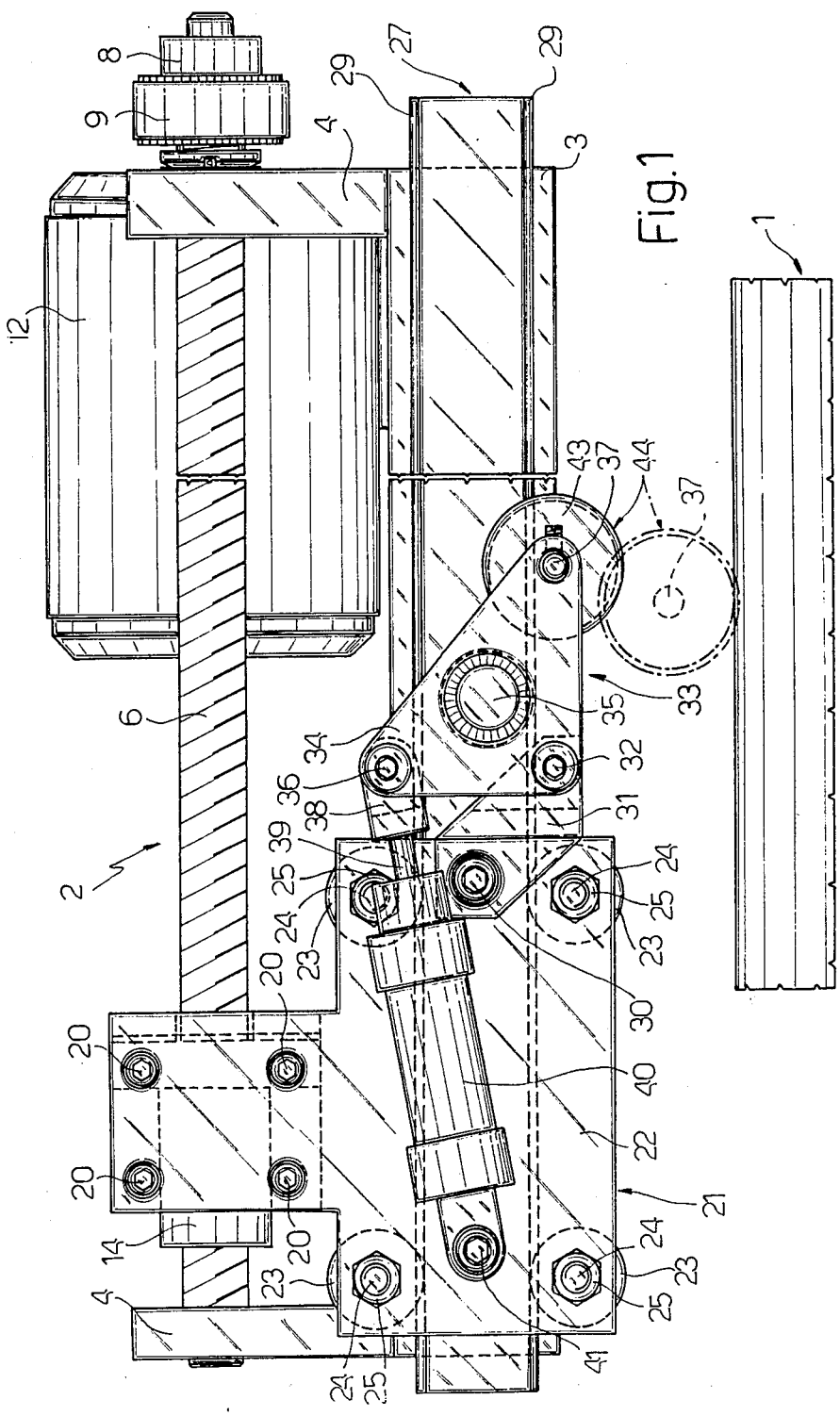
FIG. 1 shows a side view of one embodiment of the splicing device according to the present invention.

Number 1 in FIG. 1 indicates a tire building drum, in particular, a drum for building first stage tires or carcasses.

As shown in FIGS. 1 and 3, there is located substantially over drum 1 an automatic transverse splicing device 2 comprising a tubular, substantially square-section crosspiece 3 extending parallel with the axis of drum 1.

Crosspiece 3 is supported in the position shown by a fixed support (not shown), and is provided at each axial end with a vertical bracket 4 supporting, in a rotary manner via the interposition of a respective bearing 5 (FIG. 2), a respective end of a screw 6. By means of a key 7, an end portion of screw 6 is fitted with a toothed pulley 8 driven, via a toothed belt 9, by a toothed pulley 10 fitted onto shaft 11 of electric motor 12 supported on crosspiece 3 by means of bracket 13.

As shown, particularly in FIG. 2, screw 6 is connected to a nut screw 14 having an end flange 15 connected, via screws 16, to a first arm 17 of an L-shaped bracket 18, the second arm 19 of which extends parallel with crosspiece 3 and is connected, via screws 20, to carriage 21. Carriage 21 comprises a flat plate 22, arranged substantially vertically and connected to arm 19 via said screws 20, and two pairs of rollers 23, each of which is mounted for rotation on a pin 24 mounted through plate 22 and secured to the same by means of a respective nut 25. Each roller 23 includes an intermediate annular groove 26, and the rollers of each pair of rollers 23 are arranged on opposite sides of a blade 27 lying in a plane parallel with plate 22 and extending along substantially the entire length of crosspiece 3 to which blade 27 is connected integrally via the interposition of a spacer 28 (FIGS. 2 and 3). Blade 27 presents tapered opposite side edges 29, designed to engage grooves 26 on rollers 23, and constitutes a fixed guide enabling the travel of carriage 21.

As shown in FIGS. 1 and 2, one end of carriage 21 is connected, via screw 30, to an appendix member 31, to the free end of which is hinged, via pin 32, a rocker arm 33.

As shown in FIGS. 2 and 3, rocker arm 33 consists of two substantially triangular plates 34 arranged facing each other and connected mutually integrally by means of a cylindrical spacer 35 perpendicular to plates 34 and crosspiece 3, and arranged substantially horizontally parallel with the rotational axes of rollers 23.

Plates 34 are fitted through with pin 32 on one tip, and with additional pins 36 and 37 on the other two tips. Pin 36 provides for hinging rocker arm 33 to a fork 38 mounted on the free end of a rod 39 on an actuator 40, the end opposite that supporting rod 39 being hinged to carriage 21 via a threaded pin 41. Pin 37 is arranged parallel with pins 24, 32 and 36 and perpendicular to the rotational axis of tire building drum, and supports, in a rotary manner, via the interposition of respective bearings 42, a number of parallel rollers 43 having different diameters and combining to define a single splicing roller 44, the outer surface of which is concave and, as shown in FIG. 3, presents a curve radius equal to that of drum 1.

In actual operation, splicing roller 44 may be moved, by virtue of actuator 40, between a raised idle position, shown by the continuous line in FIGS. 1 and 3, and a lowered operating position shown by the dotted line in FIGS. 1 and 3 wherein the outer surface of splicing roller 44 contacts the outer surface of tire building drum 1. With roller 44 in the said lowered operating position contacting an end portion of drum 1, operation of motor 12 causes carriage 21 to travel along guide blade 27 and, at the same time, shifts roller 44 along the generating line of drum 1. The contact pressure between roller 44 and drum 1 may easily be regulated by means of actuator 40. When roller 44 comes to the end of its travel along drum 1, actuator 40 may be activated for returning roller 44 to its raised idle position before motor 12 is reversed for returning carriage 21 to its original position.

From the foregoing description, it follows that roller 44 may be employed for fully automatically exerting controlled pressure along an axial portion of drum 1, which pressure may be employed for affixing directly onto the surface of drum 1 one end of a first layer of uncured or green elastomeric material (not shown), as well as for splicing together in a superimposed manner the front and rear edges of any layer of green elastomeric material (not shown).

In connection with roller 44, it should be pointed out that forming the same from a number of parallel rollers 43 minimizes the rolling friction between roller 44 and drum 1, provides for substantially uniform contact pressure between roller 44 and drum 1, and substantially eliminates any danger of seizing.

From the foregoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the spirit and scope of the invention with the latter being determined solely by reference to the claims appended hereto.

What is claimed is:

1. An automatic transverse splicing device for assembling layers of components for tires, particularly for affixing the front axial edge of a first layer to the outer surface of a tire building drum and for splicing together the opposite axial edges of said first layer and the opposite axial edges of subsequent layers in a first stage of tire assembly, the said device being designed to cooperate with a lateral strip portion of the curved outer surface of said tires building drum in a non-rotating phase of said tire building drum, said device comprising:
   (a) a concave splicing roller located facing the said lateral strip portion of the curved outer surface of the said tire building drum;
   (b) guide means extending laterally in relation to and parallel with the axis of said tire building drum;
   (c) slide means designed to travel along the said guide means;
   (d) driving means for moving said slide means in reciprocating manner along said guide means, said splicing roller being supported by said slide means; and
   (e) actuating means, provided between said slide means and said splicing rollers, for moving said splicing roller, in relation to said slide means, to and from an operating position cooperating with said lateral strip portion of the curved outer surface of the said tire building drum, said actuating means including dual rocker arm means, each of said rocker arm means having a fulcrum portion, said rocker arm means being hinged onto said slide means and fitted in a rotary manner with said splicing roller, and a linear actuator located between said slide means and said rocker arm means for pivoting the said rocker arm means about their respective fulcrum portions and for moving said splicing roller to and from said operating position, wherein each rocker arm is substantially triangular in shape with three tips, said fulcrum portion being located on one of said tips, with said splicing roller and said linear actuator engaging each of the said rocker arms on the other two tips, respectively.

2. A device as claimed in claim 1, wherein said splicing roller consists of a number of parallel rollers having different outside diameters, said rollers cooperating to form a single roller, the combined outer surface of which is concave.

3. A device as claimed in claim 2, wherein the concave outer surface of said single roller presents a curve radius that is substantially equal to the curve radius of said tire building drum.

* * * * *